Dec. 27, 1955   H. HARGREAVES   2,728,360
ADJUSTABLE CLIPS
Filed March 23, 1953
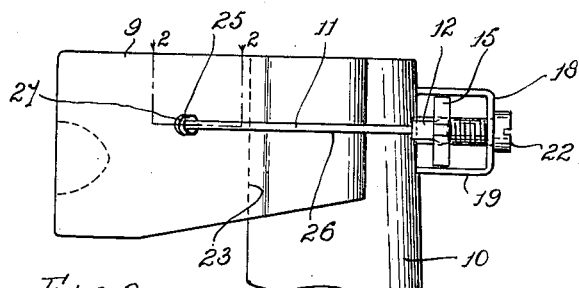
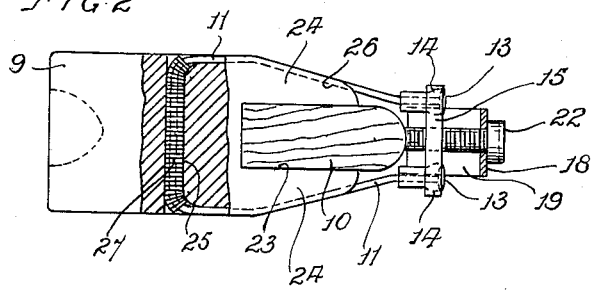
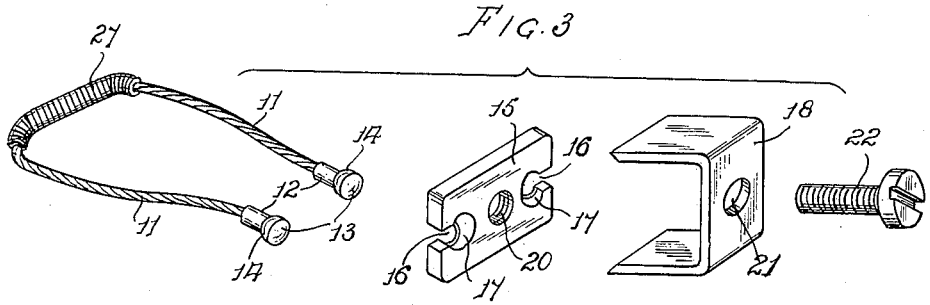
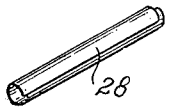
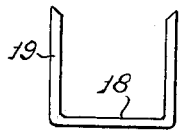
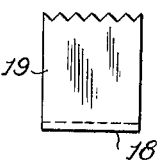
INVENTOR:
HARRY HARGREAVES
BY:

United States Patent Office 2,728,360
Patented Dec. 27, 1955

2,728,360

ADJUSTABLE CLIPS

Harry Hargreaves, Manchester, England

Application March 23, 1953, Serial No. 344,113

Claims priority, application Great Britain March 21, 1952

8 Claims. (Cl. 139—159)

This invention relates to adjustable clips of the kind used to surround or partially embrace two objects and clip them tightly together when adjusted, and whilst it can be used for many purposes, it is particularly effective when embodied in the picker assembly of an underpick loom for securing the picker to the picker stick.

The present invention comprises an adjustable clip or connecting device for securing one object to another, and of the kind used to surround or embrace the objects and clip them tightly together, when adjusted, said device comprising a flexible substantially inelastic element adapted to be looped around the said objects and having its end portions respectively anchored, at least one detachably, at their extremities to the end portions of a bridge piece inter-connecting said loop end portions, and a thrust member associated with the bridge piece and movable, relatively thereto, and having parts adapted to bear on the one object to which the other object is to be secured, and means for adjusting the said flexible member tightly about said objects to secure them together.

Preferably, when the invention is used to attach a picker to the picker stick of an underpick loom, the picker is bored to enable the flexible element to be looped therethrough, the bored hole being provided with a tubular reinforcing element, to prevent damage to the picker. Alternatively the reinforcing element may be mounted on the flexible element prior to locating them in the bored hole.

The invention also includes a picker assembly for the picker stick of an underpick loom, comprising a picker having a longitudinal slot in its rear surface to receive the picker stick and to provide on the picker side cheeks which will embrace the picker stick when the picker is applied to the stick; and a clip for detachably securing the picker to the picker stick, such clip comprising a flexible substantially inelastic element threaded transversely completely through the picker and having its end portions bent rearwardly over the said cheeks and respectively detachably anchored at their rear ends to the end portions of a bridge piece extending between them, and a thrust member having parts adapted to bear on the rear edge of the picker stick when the picker is applied thereto, and adjustable means on said thrust member and/or said bridge piece for drawing the said bridge piece towards the thrust member thereby to draw the said flexible element tightly about the picker stick to secure the picker firmly on the stick with the side cheeks of the picker pressing against the sides of the picker stick.

The invention is more particularly set forth with reference to the accompanying drawings, wherein:

Fig. 1 is a side view of a portion of a picker assembly of an underpick loom showing a picker mounted on a picker stick in accordance with the invention.

Fig. 2 is a part section on the line 2—2, Fig. 1.

Fig. 3 is an exploded perspective view of the adjustable clip attaching the picker to the picker stick.

Fig. 4 is a detail view illustrating a tubular reinforcing member or insert for use in protecting the picker against damage when the clip is adjusted.

Fig. 5 is a detail view illustrating a modification.

Fig. 6 is a detail view illustrating a further modification.

Fig. 7 is a detail view illustrating a still further modification.

Referring now to Figs. 1 to 3 of the drawings, the clip illustrated therein, suitable for use in a picker assembly for attaching a picker 9 used in an underpick loom to a picker stick 10, comprises a flexible substantially inelastic part 11 conveniently made of wire, and preferably of stranded wire such as that commonly known as "Bowden wire." The ends of the flexible part are provided with nipples 12 which are cold swaged on to the wire, and the wire ends splayed out into a conical cavity 13 in the head of the nipple and then soldered in position, whereby the strength of the nipple to wire joint is as strong as the tensile strength of the wire. The nipples are also provided with a spherical face 14 for a purpose to be described later. By means of the nipples the flexible wire member is attached or anchored to the end portions of a bridge piece consisting of a small plate 15. The plate 15 is fashioned at each end with a notch or bifurcation 16 of approximately keyhole shape, in which the nipples 12 at the end of the wire are located, each seating in a notch. The notches are counterbored with a spherical base 17 to provide a seating face complementary to the spherical faces 14 to allow the nipples to swivel outwardly if so desired. The thrust member 18 is of channel section, the ends of the flange members 19 being adapted to bear against the picker stick 10. The plate 15 lies between the flanges 19, and both the plate and the thrust member are drilled at 20, 21 respectively, the former being tapped to receive a stud 22 passed through the hole 21, whereby on rotation of the stud the plate will move relatively to the thrust member, the flanges 19 holding the plate against rotation.

The picker 9 has a longitudinal slot 23 to receive the picker stick and to provide picker side cheeks 24 which will embrace the picker stick when the picker is applied to the stick. The picker is bored at 25 to allow the wire 11 to be looped or passed therethrough, and is also provided with wire locating grooves 26 at either side. The bore 25 is reinforced by the insertion and location of a helical coil 27 of metal wire, nylon or plastic in spring-like form, the coil being positioned on the wire after the first nipple has been fitted to one end thereof and is so made to push home tightly into the hole and thereby prevent the wire when tightened from cutting into the picker. Alternatively the hole can be reinforced by means of a split vulcanised fibre tube 28 illustrated in Fig. 4, the tube being coiled around the wire before being pushed home into the hole.

When assembling the picker on the stick, the wire is looped or threaded through the picker, and the end portions caused to embrace the picker stick before being attached to the ends of the plate 15. The keyhole shape of the notches facilitates the ready attaching and detaching of the wire from the plate. The stud 22 is then rotated to adjust the plate 15 towards the bridge piece to draw the wire tightly about the picker and stick, and forcing the thrust member to bind or bear on the stick, whilst the side cheeks of the picker are pressed against the sides of the stick to fix the picker securely on the stick.

If desired, only one end of the flexible element is detachable from the plate, the other being locked in its notch to prevent the plate and element from being separated.

In the modification illustrated by Fig. 5, the ends of the flanged members 19 of the thrust member are bevelled or chamfered to bite into the back of the picker stick, thus affording a more positive grip on the stick when tightened up. Alternatively, as illustrated by Fig. 6, they can be serrated, or as illustrated by Fig. 7 they can be curved to increase the bearing or contact surface and to accommodate round-backed sticks.

The spherical faces 14 of the nipples and the complementary seating bases 17 on the plate 15 allow the nipples to swivel outwardly to accommodate varying thicknesses of picker stick.

I claim:

1. A picker assembly for the picker stick of an underpick loom, such assembly comprising a picker having a longitudinal slot in its rear surface to receive the picker stick and to provide, on the picker, side cheeks which will frictionally embrace the front and sides of the picker stick when the picker is applied to the latter; and an adjustable clip for detachably securing the picker to the picker stick, such clip comprising a length of wire threaded transversely completely through the picker and having its end portions bent rearwardly over the said side cheeks; a bridge piece extending between the said end portions of the flexible element; a headed nipple fixed securely to each end of said length of wire, each such nipple seating in a notch at an end of said bridge piece; a thrust member having parts adapted to bear on the rear edge of the picker stick when the picker is applied thereto; and adjustable means for moving the said bridge piece relatively to the thrust member thereby to draw the said length of wire tightly about the picker stick to secure the picker firmly on the stick and cause the said side cheeks of the picker to press against the sides of the picker stick.

2. The picker assembly of claim 1, wherein said flexible element comprises a length of stranded wire.

3. The picker assembly of claim 2, wherein each said notch of the bridge piece is of approximately keyhole shape so that, when the said wire is under tension, the said nipples are locked against transverse movement in said bridge piece but can readily be detached from the latter when the tension in the wire is released.

4. The picker assembly of claim 3, wherein the notches of the bridge piece are counterbored to provide a spherical seating for the headed nipples, the seating faces of the latter being shaped complementary to the said spherical seating to allow the nipples to swivel outwardly so that the picker assembly may be used for varying thicknesses of picker sticks.

5. A picker assembly for the picker sticks of an underpick loom, such assembly comprising a picker having a longitudinal slot in its rear surface to receive the picker stick and to provide, on the picker, side cheeks which will frictionally embrace the front and sides of the picker stick when the picker is applied to the latter; and an adjustable clip for detachably securing the picker to the picker stick, such clip comprising a loop of stranded wire threaded completely transversely through the picker and having its end portions bent rearwardly over the said side cheeks; a headed nipple securely fixed at each end of said loop of stranded wire; a bridge piece extending between the said nipples and having a notch of approximately keyhole shape at each end to provide a seating for the said nipples and to enable the latter to be anchored detachably to the said bridge piece; a thrust member having parts adapted to bear on the rear edge of the picker stick, when the picker is applied thereto; and adjustable means for drawing the said bridge piece towards the thrust member, said bridge piece having a length less than the width of the picker at the part thereof through which the loop of stranded wire is threaded so that, as the said bridge piece is drawn towards the said thrust member by the said adjustable means, the said loop of stranded wire is drawn tightly about the picker and presses the side cheeks of the picker onto the sides of the picker stick so as to secure the picker firmly on the picker stick.

6. An adjustable clip for attaching a picker used in an underpick loom to a picker stick, such clip comprising a flexible substantially inelastic element in the form of a loop; a bridge piece extending between the ends of said flexible element, the latter having its end anchored, at least one detachably, to the end portions of said bridge piece; a channel shaped thrust member having a base portion and side flanges, said side flanges being adapted to straddle the said bridge piece and bear on the rear edge of a picker stick, when the clip is in use; and adjustable screw means for drawing the said bridge piece towards the base portion of the channel shaped thrust member.

7. The adjustable clip of claim 6, wherein a headed nipple is securely fixed at each end of the said flexible element and the said bridge piece is provided with a notch of approximately keyhole shape at each end to provide a seating for said nipples and to enable the latter to be anchored detachably to the said bridge piece.

8. A picker assembly for the picker stick of an underpick loom, such assembly comprising a picker having a longitudinal slot in its rear surface to receive the picker stick and to provide, on the picker, side cheeks which will frictionally embrace the front and sides of the picker stick when the picker is applied to the latter; and an adjustable clip for detachably securing the picker to the picker stick, such clip comprising a flexible substantially inelastic element threaded transversely completely through the picker, which is bored to provide a hole for the element, and having its end portions bent rearwardly over the said side cheeks; a tubular reinforcing insert located in said hole in the picker to prevent said element cutting into the body of the picker; a bridge piece extending between the said end portions of the flexible element, the latter having its ends anchored, at least one detachably, to the end portions of said bridge piece; a thrust member having parts adapted to bear on the rear edge of the picker stick when the picker is applied thereto; and adjustable means for moving the said bridge piece relatively to the thrust member thereby to draw the said flexible element tightly about the picker stick to secure the picker firmly on the stick and cause the said side cheeks of the picker to press against the sides of the picker stick.

References Cited in the file of this patent

UNITED STATES PATENTS

| | | |
|---|---|---|
| 39,714 | Cady | Sept. 1, 1863 |
| 322,140 | Thrash | July 14, 1885 |
| 1,262,489 | Hawk | Apr. 9, 1918 |
| 1,517,768 | Towers | Dec. 2, 1924 |
| 2,075,239 | Strange | Mar. 30, 1937 |
| 2,171,120 | Bullard | Aug. 29, 1939 |